Patented Jan. 19, 1932

1,842,024

UNITED STATES PATENT OFFICE

CHARLES S. HOLLANDER, OF PHILADELPHIA, AND PARKER H. DEL PLAINE, OF BRISTOL, PENNSYLVANIA, ASSIGNORS TO RÖHM & HAAS COMPANY, OF PHILADELPHIA, PENNSYLVANIA, A CORPORATION OF DELAWARE

PROCESS FOR RETTING FIBERS

No Drawing.   Application filed May 17, 1929. Serial No. 363,988.

This invention relates to a process for producing valuable fibers from plants of the type in which a cellulose fiber is surrounded by a cortex of ligneous material, such as flax, ramie, jute, sisal, hemp, etc. and has for its object the provision of a new and improved process of this type which is economical, is easily controlled and requires only a comparatively short time for completion.

In the conversion of fiber flax to linen fiber by the only process which has so far been successfully employed, and is still considered the best, the dry plant is subjected to a procedure called "retting". This process is based on the action of bacteria on the fiber plant, the cortex of which is attacked by bacteria so that it can be easily removed from the actual cellulose fiber. It is carried out by placing the plants either in running or still water, or by spreading them on the ground or placing them in stacks and utilizing natural dew as a source of moisture.

The time necessary for the complete degradation of the cortex on the cellulose fibers according to these processes depends on the working conditions adopted, but under the very best conditions this removal requires at least eight days. During the entire time of working the process must be carefully supervised, for the action of the bacteria must be interrupted at exactly the right moment, a few hours continuation of the bacterial action over the required amount often causing a very serious and irretrievable damage to the resultant product.

Moreover, this process can only be carried out in certain localities where water conditions and human experience have found it to be practicable.

It is, of course, obvious that in this known process there is absolutely no way in which the action of the bacteria can be controlled; that is, there is no way to assure the action of only a certain bacterium or even a predominance of certain bacteria, since the bacteria present depend entirely on the nature of the soil on which the flax is grown and on the water supply in its natural state. The success of the process is, therefore, largely a matter of chance, it being often the case that a predominance of harmful bacteria will, through some unknown agency, pollute the water used in the process and destroy the fibers.

Another objection to this process, which has been largely responsible for its restriction to certain localities, is the extremely offensive odor that is given off in the course of the bacterial action.

This very tedious and uncertain process has, therefore, rendered a universal use of these fibers rather prohibitive. To avoid this, attempts have been made to carry out the retting with chemicals rather than with bacteria. Thus far, the substitution has been unsuccessful since a chemical which will efficiently attack the cortex will also attack the cellulose fiber, rendering it brittle and of little value.

We have found that this delicate process of retting may be carried out better and in shorter time by treating the plants with chemicals capable of attacking the cortex, the duration of the treatment being insufficient to permit the chemical to attack the cellulose fiber, and combining with this treatment the action of selected, prepared enzymes that will attack only those parts of the plant that must be destroyed before the cellulose fiber is laid bare without any appreciable action on the cellulose proper.

By the employment of these agencies, the process can be very rigidly and easily controlled by anyone without extensive experience and results in fibers far superior to those of the old process which had to rely on fermentation by chance bacteria.

Moreover, there is no offensive odor accompanying this process, whereby the extensive practice of the same will not be discouraged, and the time necessary to complete the process is usually only about two days.

Our process is not only applicable to fiber flax but to seed flax straw as well, which is now a waste product from the flax seed harvest and is usually entirely wasted or burned. It is also applicable to all other plant fibers of a similar nature, such as ramie, jute, sisal, etc.

We have found that the best results are produced by treating the plant fiber in the chemical liquid first and then treating with an enzyme in preference to applying the steps in the reverse order, because by the action of the chemical bath the cortex is opened up and made more accessible to the action of the enzyme.

The chemicals which we employ are alkaline liquids such as caustic soda, caustic potash, soda ash, calcium hydroxide and soap solutions, either alone or in combination with any of the aforementioned substances. Generally, we prefer to add a buffer to this alkaline bath to protect the cellulose fibers by moderating the action of the alkaline liquid thereon. Any well known buffer salt may be used for this purpose, such as, sodium phosphate, sodium borate, common salt. etc., but we obtain the best results with Glauber's salt.

Generally speaking, the volume of the alkaline bath is such that it weighs from ten to twenty-five times as much as the plant straw being treated. The straw is boiled in this alkaline bath for a period of from one to four hours, depending on the nature of the bath as regards reagents, concentration and the nature of the straw itself.

The following is a list of the most desirable alkaline solutions:

|   |   | Between— |
|---|---|---|
| (1) | Caustic soda alone | 5 and 15% |
| (2) | Soda ash alone | 10 and 20% |
| (3) | Calcium hydroxide | 5 and 15% |
| (4) | Soap | 10 and 30% |
| (5) | Caustic and soap each | 5 and 10% |
| (6) | Soda ash and soap each | 5 and 15% |
| (7) | Caustic, soap and Glauber's salt each | 5 and 10% |
| (8) | Soda ash, soap and Glauber's salt each | 5 and 15% |

Volume of liquor between 10 and 25 times weight of straw. Time in boil between 1 and 4 hours.

After this preliminary boil, the straw is placed in an enzyme bath. As pointed out above, the steps could be reversed, but if they were, the amount of enzyme necessary to be added would be much greater.

We may use enzymes prepared from numerous micro-organisms or the actual cultures of micro-organisms or extracts made from them. In any event, the enzymes must be of such a nature that they digest the substances surrounding the cellulose fibers and from which the fibers must be liberated. We presume that the materials to be digested are in the nature of lignins and hemicelluloses. including furfural-yielding compounds such as pentoses and pectins, and we will hereinafter and in the claims refer to these materials as "ligneous material". Suitable enzymes are, therefore, such as enzymes prepared from fungi, such as *Aspergillus flavus*, *Aspergillus oryzae* and other species of Aspergillus, as well as Penicillium, Mucor, Rhizopus and various other fungi, as well as those prepared from bacteria, such as members of the *Bacteria subtilis-mesentericus* group, *Bacteria carotovorus* and other bacteria.

In the enzyme step it is sometimes, especially when working on a small scale, desirable to add to the enzyme bath a liquid such as toluene or chloroform or a mixture of the two, which will kill any chance bacteria present and prevent bacterial growth. The fact that the process is operative in the presence of these liquids is proof positive that the retting is not effected by the presence of any living organisms. The use of these liquids insures the complete elimination of offensive odor. When they are not used, a smaller amount of enzyme is sufficient to effect the retting since some bacteria are propagated and help to bring the process to completion. However, when the time of working is short, as for example, one day, the presence or absence of toluene or chloroform makes no difference in the final result since bacteria cannot propagate enough in 24 hours to cause any difference.

As is well known, in all cases where an enzyme bath is used it is desirable that the pH value of the bath be kept within certain limits since every enzyme has an optimum pH range; that is, it has a pH value at which the largest amount of work is done. Generally speaking, we have obtained the best results working in a bath having a pH value of from 5 to 8 and especially when the pH value is about 7. We regulate the pH value of the enzyme bath by the addition of acids such as acetic, sulphuric, etc.

We have further found that the action of the enzyme is greatly energized by the presence of a small amount of Glauber's salt and some others. The action of the Glauber's salt in activating the enzyme is not quite understood, but the time of working is substantially decreased by its presence.

The temperature of the enzyme bath is rarely above 30° C. although the only limit impressed on this temperature is the temperature at which the enzyme will be destroyed. The volume of the enzyme bath is such that it weighs from 10 to 20 times the weight of the fiber plant, but these limits are not mandatory. Depending on the initial material used, on the enzyme, the temperature and concentration of the bath, the duration of the enzyme step varies greatly, but will usually be between 24 and 48 hours.

The following is an example of one method of carrying out our process, but it is to be understood that there is a great latitude in the concentration of baths, duration of treatments, temperature of baths, sequence of operations and reagents used and that this example is merely an illustration of one set of conditions.

Example

Flax fiber straw is boiled in 25 times its weight of a solution containing:

| | | |
|---|---|---|
| Caustic soda | By weight of straw | 10% |
| | (By volume of solution | 0.4%) |
| Soap | By weight of straw | 10% |
| | (By volume of solution | 0.4%) |
| Glauber's salt | By weight of straw | 10% |
| | (By volume of solution | 0.4%) | for 2 hours.

It is then removed from the bath, washed thoroughly and allowed to drain. It is then placed in an enzyme bath made up as follows:

| | |
|---|---|
| Water | 15 times weight of straw |
| Enzyme preparation (prepared from Rhizopus) | 5% of weight of straw (0.33% of volume of solution) |
| Glauber's salt | 1% of weight of straw (.06% of volume of solution) | and enough acid to bring pH to about 7.
Temperature of solution 30° C.
Ret for 24 hours.
Wash thoroughly.

After thoroughly drying, the straw may be broken, skutched and hackled. The resulting product is a fine, light colored fiber with a high lustre, silkiness and scroop which is almost like that of genuine silk. It retains all the advantageous features of linen in comparison with cotton, such as greater strength, and is less subject to deterioration caused by ageing and storage for long periods in the presence of moisture and air. It has excellent dyeing properties, substantially the same as cotton. In appearance and properties it presents a striking contrast to flax which has been retted by the old process.

Upon bleaching this product in the ordinary manner, a pure, white fiber is obtained. We have found that by bleaching the straw for from one-half to two hours, preferably for one hour, in a solution of sodium hypochlorite having a concentration of 1° Tw. to 3° Tw., preferably 1½° Tw., at a temperature not above 30° C., washing, scouring ten minutes in ½° Tw. sulphuric acid, washing free from acid, drying thoroughly, hackling and combing, a very lustrous, silky, white fiber is obtained that resembles silk in appearance and feel and is unimpaired in strength. This bleaching step may follow immediately after the retting and before the breaking etc.

Having thus described the nature and objects of our invention and illustrated a preferred embodiment of the same, to which embodiment, however, we in no way limit ourselves, but contemplate various modifications within the scope of our claims, what we claim as new and desire to protect by Letters Patent is:—

1. In the retting of plant fibers of the type in which a cellulose fiber is surrounded by a cortex of ligneous material, the step of subjecting the fibers to the action of a selected enzyme capable of digesting said material.

2. In the retting of plant fibers, of the type in which a cellulose fiber is surrounded by a cortex of ligneous material, the step of treating the fibers in a bath containing an added enzyme capable of digesting said material.

3. In the retting of plant fibers, of the type in which a cellulose fiber is surrounded by a cortex of ligneous material, the step of treating the fibers in a bath which contains an added enzyme capable of digesting said material and which is substantially free from bacteria.

4. In the retting of plant fibers, in which a cellulose fiber is surrounded by a cortex of ligneous material, the step of treating the fibers in a bath containing an added enzyme capable of digesting said material and an activator for said enzyme.

5. In the retting of plant fibers, of the type in which a cellulose fiber is surrounded by a cortex of ligneous material, the step of treating the fibers in a bath which contains an added enzyme capable of digesting said material and an activator for said enzyme, and which is substantially free from bacteria.

6. In the retting of plant fibers, of the type in which a cellulose fiber is surrounded by a cortex of ligneous material, the step of treating the fibers in a bath containing an added enzyme capable of digesting said material and Glauber's salt.

7. In the retting of plant fibers, of the type in which a cellulose fiber is surrounded by a cortex of ligneous material, the step of treating the fibers in a bath which contains an enzyme capable of digesting said material and Glauber's salt and which is substantially free from bacteria.

8. In the retting of plant fibers, of the type in which a cellulose fiber is surrounded by a cortex of ligneous material, the step of treating the fibers in a bath containing an added enzyme capable of digesting said material and a substance preventing the growth of bacteria.

9. In the retting of plant fibers, of the type in which a cellulose fiber is surrounded by a cortex of ligneous material, the step of treating the fibers in a bath containing an added enzyme capable of digesting said material, an activator for said enzyme and a substance preventing the growth of bacteria.

10. In the retting of plant fibers, of the type in which a cellulose fiber is surrounded by a cortex of ligneous material, the step of treating the fibers in a bath containing an added enzyme capable of digesting said material and toluene.

11. In the retting of plant fibers, of the type in which a cellulose fiber is surrounded by a cortex of ligneous material, the step of treating the fibers in a bath containing an added enzyme capable of digesting said material, an activator for said enzyme and toluene.

12. In the retting of plant fibers, of the type in which a cellulose fiber is surrounded by a cortex of ligneous material, the step of treating the fibers in a bath containing an added enzyme capable of digesting said material, Glauber's salt and toluene.

13. In the retting of plant fibers, of the type in which a cellulose fiber is surrounded by a cortex of ligneous material, the step of treating the fibers in a bath containing an added enzyme derived from fungi, Glauber's salt and toluene.

14. The process of retting plant fibers of the type in which a cellulose fiber is surrounded by a cortex of ligneous material, which comprises the steps of boiling the fibers in an alkaline bath and treating the fibers in a bath containing an added enzyme capable of digesting said material, in any desired order.

15. The process of retting plant fibers, of the type in which a cellulose fiber is surrounded by a cortex of ligneous material, which comprises the steps of boiling the fibers in an alkaline bath for a length of time insufficient to permit the alkali to attack the cellulose fiber, removing the fibers from this bath, washing them and then treating them in a bath containing an added enzyme capable of digesting said material.

16. The process of retting plant fibers, of the type in which a cellulose fiber is surrounded by a cortex of ligneous material, which comprises the steps of boiling the fibers in a bath containing a caustic alkali and a buffer, and then treating the fibers in a bath containing an added enzyme capable of digesting said material.

17. The process of retting plant fibers, of the type in which a cellulose fiber is surrounded by a cortex of ligneous material, which comprises the steps of boiling the fibers in an alkaline bath and then treating the fibers in a bath containing an added enzyme capable of digesting said material and an activator for said enzyme.

18. The process of retting plant fibers, of the type in which a cellulose fiber is surrounded by a cortex of ligneous material, which comprises the steps of boiling the fibers in a bath containing caustic alkali and a buffer salt, and then treating the fibers in a bath containing an added enzyme capable of digesting said material and an activator for said enzyme.

19. The process of retting plant fibers, of the type in which a cellulose fiber is surrounded by a cortex of ligneous material, which comprises the steps of boiling the fibers in a bath containing caustic alkali and Glauber's salt, and then treating the fibers in a bath containing an added enzyme capable of digesting said material and an activator for said enzyme.

20. The process of retting plant fibers, of the type in which a cellulose fiber is surrounded by a cortex of ligneous material, which comprises the steps of boiling the fibers in a bath containing caustic soda and Glauber's salt, removing the fibers from the bath, washing the fibers and then treating them in a bath containing an added enzyme derived from fungi and Glauber's salt.

21. In the retting of plant fibers of the type in which a cellulose fiber is surrounded by a cortex of ligneous material, the step of subjecting the fibers to the action of an enzyme selected from the group consisting of enzymes prepared from fungi of the Aspergillus, Penicillium, Mucor and Rhizopus groups, and from bacteria of the *Bacillus subtilismesentericus* and *carotovorus* groups.

22. In the retting of plant fibers, of the type in which a cellulose fiber is surrounded by a cortex of ligneous material, the step of treating the fibers in a bath containing an added enzyme selected from the group consisting of enzymes prepared from fungi of the Aspergillus, Penicillium, Mucor and Rhizopus groups, and from bacteria of the *Bacillus subtilismesentericus* and *carotovorus* groups.

23. In the retting of plant fibers, of the type in which a cellulose fiber is surrounded by a cortex of ligneous material, the step of treating the fibers in a bath containing an added enzyme selected from the group consisting of enzymes prepared from fungi of the Aspergillus, Penicillium, Mucor and Rhizopus groups, and from bacteria of the *Bacillus subtilismesentericus* and *carotovorus* groups.

24. In the retting of plant fibers, of the type in which a cellulose fiber is surrounded by a cortex of ligneous material, the step of treating the fibers in a bath containing an added enzyme selected from the group consisting of enzymes prepared from fungi of the Aspergillus, Penicillium, Mucor and Rhizopus groups, and from bacteria of the *Bacillus subtilismesentericus* and *carotovorus* groups.

25. In the retting of plant fibers, of the type in which a cellulose fiber is surrounded by a cortex of ligneous material, the step of treating the fibers in a bath containing an added enzyme selected from the group consisting of enzymes prepared from fungi of the Aspergillus, Penicillium, Mucor and Rhizopus groups, and from bacteria of the *Bacillus subtilismesentericus* and *carotovorus* groups and a substance preventing the growth of bacteria.

26. In the retting of plant fibers, of the type in which a cellulose fiber is surrounded by a cortex of ligneous material, the step of treating the fibers in a bath containing an added enzyme selected from the group consisting of enzymes prepared from fungi of the Aspergillus, Penicillium, Mucor and Rhizopus groups, and from bacteria of the *Bacillus subtilismesentericus* and *carotovorus* groups and toluene.

27. In the retting of plant fibers, of the type in which a cellulose fiber is surrounded by a cortex of ligneous material, the step of treating the fibers in a bath containing an added enzyme selected from the group consisting of enzymes prepared from fungi of the Aspergillus, Penicillium, Mucor and Rhizopus groups, and from bacteria of the *Bacillus subtilismesentericus* and *carotovorus* groups, Glauber salt and toluene.

28. In the retting of plant fibers, of the type in which a cellulose fiber is surrounded by a cortex of ligneous material, the step of subjecting the fibers to the action of an enzyme prepared from Rhizopus fungi.

29. In the retting of plant fibers, of the type in which a cellulose fiber is surrounded by a cortex of ligneous material, the step of treating the fibers in a bath containing an added enzyme prepared from Rhizopus fungi.

30. In the retting of plant fibers, of the type in which a cellulose fiber is surrounded by a cortex of ligneous material, the step of treating the fibers in a bath containing an added enzyme prepared from Rhizopus fungi, and an activator for said enzyme.

31. In the retting of plant fibers, of the type in which a cellulose fiber is surrounded by a cortex of ligneous material, the step of treating the fibers in a bath containing an added enzyme prepared from Rhizopus fungi, and Glauber salt.

32. The process of retting flax which comprises the steps of treating the flax in a hot alkaline bath and treating the flax in a bath containing an added enzyme derived from fungi in any desired order.

33. In the retting of flax, the step of subjecting the flax to the action of an enzyme selected from the group consisting of enzymes prepared from fungi of the Aspergillus, Penicillium, Mucor and Rhizopus groups, and from bacteria of the *Bacillus subtilismesentericus* and *carotovorus* groups.

34. In the retting of flax, the steps of subjecting the flax to the action of an enzyme selected from the group consisting of enzymes prepared from fungi of the Aspergillus, Penicillium, Mucor and Rhizopus groups, and from bacteria of the *Bacillus subtilismesentericus* and *carotovorus* groups, and subjecting the fibers to the action of a hot alkaline bath in any desired order.

In testimony whereof we have hereunto set our hands.

CHARLES S. HOLLANDER.
PARKER H. DEL PLAINE.